United States Patent
Hiddema

(10) Patent No.: US 9,526,202 B2
(45) Date of Patent: Dec. 27, 2016

(54) SELF PROPELLED AGRICULTURAL APPLICATION MACHINE

(75) Inventor: Joris Hiddema, Grubbenvorst (NL)

(73) Assignee: AGCO Netherlands B.V, Grubbenvorst (NL)

(*) Notice: Subject to any disclaimer, the term of this patent is extended or adjusted under 35 U.S.C. 154(b) by 532 days.

(21) Appl. No.: 13/059,175

(22) PCT Filed: Aug. 17, 2009

(86) PCT No.: PCT/EP2009/060604
§ 371 (c)(1),
(2), (4) Date: Feb. 15, 2011

(87) PCT Pub. No.: WO2010/020605
PCT Pub. Date: Feb. 25, 2010

(65) Prior Publication Data
US 2011/0147497 A1    Jun. 23, 2011

(30) Foreign Application Priority Data

Aug. 22, 2008 (GB) .................................. 0815344.7

(51) Int. Cl.
| | |
|---|---|
| B62D 21/00 | (2006.01) |
| A01C 23/00 | (2006.01) |
| A01M 7/00 | (2006.01) |
| B60K 15/03 | (2006.01) |

(52) U.S. Cl.
CPC .......... *A01C 23/008* (2013.01); *A01M 7/0085* (2013.01); *B60K 2015/03388* (2013.01); *B60K 2015/03473* (2013.01)

(58) Field of Classification Search
CPC  A01M 7/0014; A01M 7/0042; A01M 7/0082; A01M 7/008; A01M 7/0085; A01C 23/008; B60K 2015/03473; B60K 2015/03388; B60K 15/063; B60K 2015/0633; B60K 2015/0632; B62D 21/02; B62D 49/0657; B62D 49/08; B62D 49/085; B62D 33/00; B62D 1/02
(Continued)

(56) References Cited

U.S. PATENT DOCUMENTS

| | | | |
|---|---|---|---|
| 3,977,489 A * | 8/1976 | Cole et al. ..................... | 180/89.1 |
| 4,696,365 A * | 9/1987 | Ishimori ............. | B60K 17/348 |
| | | | 180/233 |
| 4,807,904 A * | 2/1989 | Kamlukin et al. ............ | 280/781 |

(Continued)

FOREIGN PATENT DOCUMENTS

| | | |
|---|---|---|
| DE | 202007012045 U | 12/2007 |
| JP | 08107745 A | 4/1996 |

(Continued)

OTHER PUBLICATIONS

PCT Search Report of PCT/EP2009/060604 dated Nov. 11, 2009.
UK Search Report of GB0915344.7 dated Dec. 4, 2008.

*Primary Examiner* — Arthur O Hall
*Assistant Examiner* — Alexander Valvis

(57) ABSTRACT

A self-propelled agricultural application machine (10) comprising a chassis (100) which carries a storage tank (15) for the material to be applied is provided. The chassis (100) comprises a central longitudinal beam (110) from which at least a pair of wheels (12, 14) are suspended. The narrow chassis (100) allows steerable wheels to be positioned at tolerable track widths while permitting a large steering angle and thus small turning radii.

11 Claims, 8 Drawing Sheets

(58) Field of Classification Search
USPC .............. 239/159–170, 722, 735, 744, 146;
180/89.12; 280/DIG. 14; 220/4.14
See application file for complete search history.

(56) References Cited

U.S. PATENT DOCUMENTS

| | | | |
|---|---|---|---|
| 4,856,545 A * | 8/1989 | Krajicek et al. | 134/166 C |
| 5,421,613 A * | 6/1995 | Allison et al. | 280/789 |
| 5,755,382 A * | 5/1998 | Skotinkov | 239/161 |
| 6,042,020 A * | 3/2000 | Weddle | 239/166 |
| 6,056,210 A * | 5/2000 | Weddle | 239/159 |
| 6,994,274 B2 * | 2/2006 | Thompson et al. | 239/146 |
| 7,246,846 B2 * | 7/2007 | Shioji et al. | 296/190.11 |
| 7,344,187 B2 * | 3/2008 | Murakami | 296/190.03 |
| 7,401,673 B2 * | 7/2008 | Fukazawa et al. | 180/89.12 |
| 7,445,272 B2 * | 11/2008 | Lee | 296/190.03 |
| 7,984,925 B2 * | 7/2011 | Levin et al. | 280/833 |
| 2008/0011877 A1 * | 1/2008 | Hibbard et al. | 239/146 |
| 2008/0295870 A1 * | 12/2008 | Perelli et al. | 134/42 |
| 2009/0166117 A1 * | 7/2009 | Hokimoto | 180/89.12 |
| 2009/0194984 A1 * | 8/2009 | White | 280/781 |
| 2009/0200785 A1 * | 8/2009 | Weibling et al. | 280/781 |
| 2010/0192551 A1 * | 8/2010 | Yokota | B60K 15/063 60/295 |
| 2010/0207425 A1 * | 8/2010 | Ben-Ari et al. | 296/187.07 |
| 2011/0068566 A1 * | 3/2011 | Bartel et al. | 280/788 |

FOREIGN PATENT DOCUMENTS

| | | | | |
|---|---|---|---|---|
| JP | 2001-238587 | * | 4/2001 | A01M 9/00 |
| JP | 2001238587 A | | 9/2001 | |
| NL | 8600830 | * | 4/1986 | |
| NL | 8600830 A | | 11/1987 | |
| WO | WO 0074481 A1 | | 12/2000 | |

\* cited by examiner

SELF PROPELLED AGRICULTURAL APPLICATION MACHINE

The invention relates to self-propelled agricultural application machines, such as crop sprayers, which comprise a chassis which carries a storage tank for the material to be applied.

Agricultural application machines such as crop sprayers comprise a large volume tank carried on a chassis. Such machines can be trailed behind a tractor or provided as a self-propelled unit having an integral cab and engine. The machine further comprises an extending boom which provides a transverse line of uniformly spaced spray nozzles connected by pipes to the tank. During operation the application machine is moved across fields of crops such as cereals and maize to apply liquid fertilizer or chemical treatment such as herbicides, fungicides and pesticides to the crop in a controlled manner.

The application machines are typically driven across the fields utilizing "tram-lines" which are often used several times throughout the growing cycle to make different applications, thereby minimising the area of lost crop through flattening by the wheels. The minimum turning radius affects the length of the tram-lines especially at the turning points on the headlands. In turn, this affects the area of crop which is lost to providing the tram-lines.

In addition, the minimum turning radius dictates the limits of the machine to reach corners and edges of fields having complex shapes. Also, the turning radius limits the maneuverability of the machine.

It is thus an object of the invention to provide a self-propelled agricultural application machine with a reduced minimum turning radius.

It is another object of the invention to provide a self-propelled agricultural application machine which has a reduced assembly time.

According to the invention there is provided a self-propelled agricultural application machine comprising a chassis which carries a storage tank for the material to be applied, the chassis comprising a single central longitudinal beam from which at least a pair of wheels are suspended. By forming the chassis from a single beam in this way, the steering angle of steerable wheels can be increased whilst still keeping the track width within constraints set by maximum widths permitted on highways.

In some countries, such as The United Kingdom, rural highways are typically narrow and limit the width of self-propelled application machines. The resulting separation between the steerable wheels and a conventional chassis is often inadequate to permit a satisfactory steering angle. To compound the problem of large turning radii, application machines often employ wheels of large diameter to achieve sufficient ground clearance. By providing a central longitudinal beam to provide a 'backbone' for the machine in accordance with the invention, the separation between the wheels and the chassis can be increased, in turn increasing the maximum steering angle without sacrificing wheel diameter.

In a preferred arrangement the application machine comprises two pairs of wheels which are suspended from the longitudinal beam. At least one of the two pairs of wheels are steerable. Preferably, both pairs of wheels are steerable delivering even smaller turning radii. As mentioned above, the provision of a central longitudinal beam allows increased turning angles. In one preferred embodiment, the steerable wheels have a maximum steering angle which is greater than 35 degrees, for example 37 degrees.

The wheels are preferably independently suspended from the longitudinal beam.

Preferably, the application machine further comprises a cab which is supported forwardly of the longitudinal beam by a cab support structure which is itself supported by the longitudinal beam. Advantageously, this places the cab in front of the chassis rather than on top. In turn this improves the forward visibility for the driver. Furthermore, the cab is disposed lower which lowers the vehicle's centre of mass thus increasing the stability thereof.

Preferably, the application machine further comprises a boom assembly which is suspended from the rear section of the longitudinal beam. Advantageously, this permits a single, centrally-disposed, parallelogram suspension structure to be employed instead of the conventional double structure. This reduces the number of components required thus saving cost.

The boom assembly is preferably pivotally mounted to the longitudinal beam to allow the boom assembly to be raised and lowered. A boom lift actuator may be provided and connected between the longitudinal beam and the boom assembly to lift and lower the boom assembly.

In a preferred embodiment the application machine further comprises an engine which is disposed to one side of the longitudinal beam and between two wheels on one side of the machine. The central longitudinal beam structure permits the engine to be located on a similar level to the chassis rather than above as in conventional self-propelled application machines. This lowers the centre of mass and improves the stability of the vehicle. Furthermore, access to the engine for maintenance is improved because there is no need for the operator to climb on top of the vehicle frame. This is both safer and more convenient.

Preferably, the engine comprises an output drive shaft which is transversely orientated. Conveniently, this permits the pumps and/or transmission components connected to the output of the engine to be located on the other side of the longitudinal beam opposite the engine thus distributing the weight more evenly.

The application machine may further comprise a fuel tank which is disposed to one side and forwardly of the longitudinal beam. To distribute the overall weight more effectively, the fuel tank is preferably disposed on the opposite side of the longitudinal beam to that of the engine.

In one preferred arrangement the fuel tank is disposed under the cab which optimises the available space and maintains a low centre of mass.

The storage tank may be asymmetric about a longitudinal vertical plane along the centre of the chassis. By moving away from the conventional symmetrical tank profile, cavities and spaces within the overall machine profile which are present only on one side thereof can be exploited to store application material so as to optimise the available volume whilst increasing the design flexibility to centralise the centre of mass. An asymmetric tank lends itself well to a machine with a relatively heavy component, for example the engine, having a centre of mass which is offset from the plane of asymmetry. In this case, the volume of the storage tank disposed to one side of the plane is preferably greater than the volume of the storage tank disposed to the other side. Advantageously, this allows the mass of a laden tank to counterbalance the weight of the heavy component thus increasing the stability of the machine.

In a preferred embodiment, an engine which is disposed on one side of the chassis and a portion of the storage tank is disposed on the other side of the chassis so as to counterbalance the weight of the engine. In a preferred arrangement, said portion is disposed opposite the engine so as to reduce any torsional force in the chassis.

Furthermore, by providing said portion of the tank by extending the volume of the tank downwardly into an available cavity, the advantageous counterbalancing effect remains even when the application material load is low. In other words, the last part of the tank to empty is the counterbalancing portion thus improving stability until the end of the application session.

Further advantages of the invention will become apparent from the following description of specific embodiments with reference to the appended drawings in which—

Figure 1:
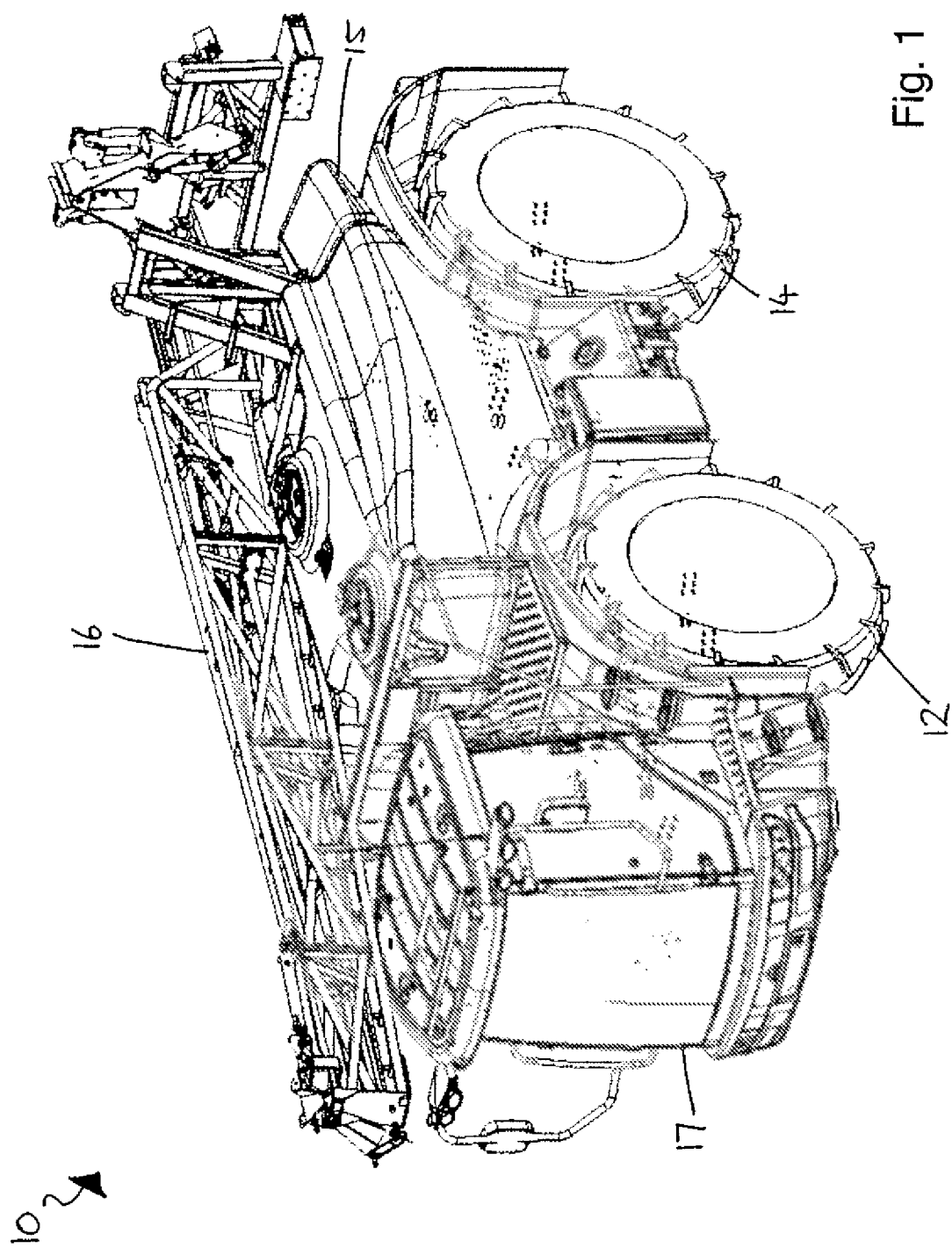
FIG. 1 is a perspective view of a self-propelled agricultural sprayer in accordance with the invention.

With reference to FIGS. 1 to 6, a self-propelled arable crop sprayer 10 comprises a pair of front wheels 12 and pair of rear wheels 14 each wheel being separately mounted to a chassis 100 by respective variable height suspension means. The sprayer 10 further comprises a tank 15, a boom assembly 16 and driver's cab 17. The tank 15 accounts for the majority of the sprayer's volume and serves to hold the liquid material which is to be applied to a field. By way of example, the liquid material may comprise fertilizer or other chemical treatment such as herbicides, fungicides, pesticides or growth restrictors.

Figure 2:
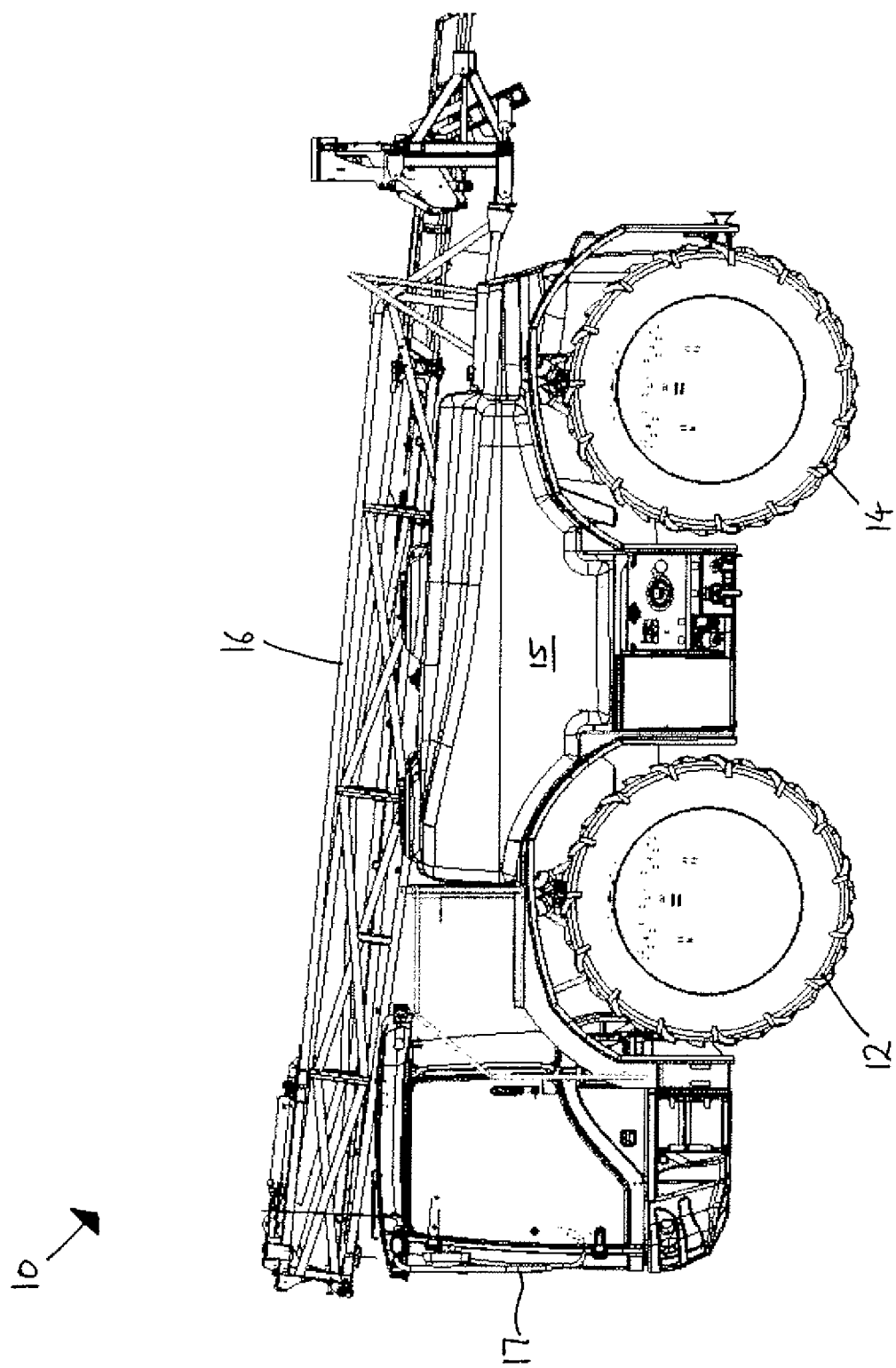
FIG. 2 is a side view of the sprayer of FIG. 1.

The liquid material is delivered in a controlled manner to spray nozzles (not shown) located on the boom assembly 16 by a network of supply pipes (not shown). In the transport mode (shown in FIGS. 1 and 2) the boom assembly 16 is retracted so as to remain substantially within the profile of the vehicle body thus allowing safe movement on the highway. In an operating mode the boom assembly 16 is extended so as to provide a transversely extending boom, having a width of 24 meters for example. Driven across an arable field, the liquid material is sprayed onto the crop in strips 24 meters wide at a time. The driver located in cab 17 controls the steering of the sprayer and the control of the liquid material application. It should be understood that FIGS. 1 and 2 show only one half (right-hand side) of the folded boom assembly 16.

With reference to FIGS. 3 to 6, the chassis 100 comprises a single, centrally-disposed, longitudinal beam 110 to which the respective wheel and boom suspension means are mounted. A first section 110a of the longitudinal beam 110 extends from the rear of the sprayer 10 to approximately a region between the front wheels 12. A second section 110b is connected to the first section 110a and extends forwardly at a lower height to the front of the sprayer 10.

All four wheels 12, 14 are steerable. Each of the four wheels 12, 14 is suspended from the longitudinal beam 110 by a respective wheel suspension assembly 115 which may, or may not, allow for adjustments to the suspension height of the chassis 100 and/or adjustments to the track width, that is the distance between opposite wheels. Each wheel suspension assembly is secured to the longitudinal beam 110 by appropriate means, for example by brackets bolted to the underside thereof.

By forming the chassis 100 from a single beam 110 in this way, the steering angle of the steerable wheels 12, 14 can be increased whilst still keeping the track width within constraints set by maximum widths permitted on highways. As can be seen from FIG. 4, the maximum achievable steering angle θ can exceed 30 degrees thus making the chassis arrangement particularly attractive to farmers and contractors desiring small turning radii from their application machines.

A further advantage of the chassis architecture is that it allows the engine 111 to be mounted to one side of the chassis 100 (see FIG. 5) thus lowering the overall centre of mass. Further, the lower positioning of the engine 111 improves access for the operator thus making maintenance far easier and safer. The engine 111 is conveniently located in the space provided between the two wheels 12, 14 on the right-hand side of the sprayer 10. An output drive shaft 112 which is driven by the engine 111 is transversely orientated with respect to the direction of travel of the sprayer 10. The drive shaft 112 is connected through the longitudinal beam 110 to hydraulic pumps 113 associated with the sprayer propulsion and spraying gear located on the left-hand side of the sprayer 10.

Figure 3:
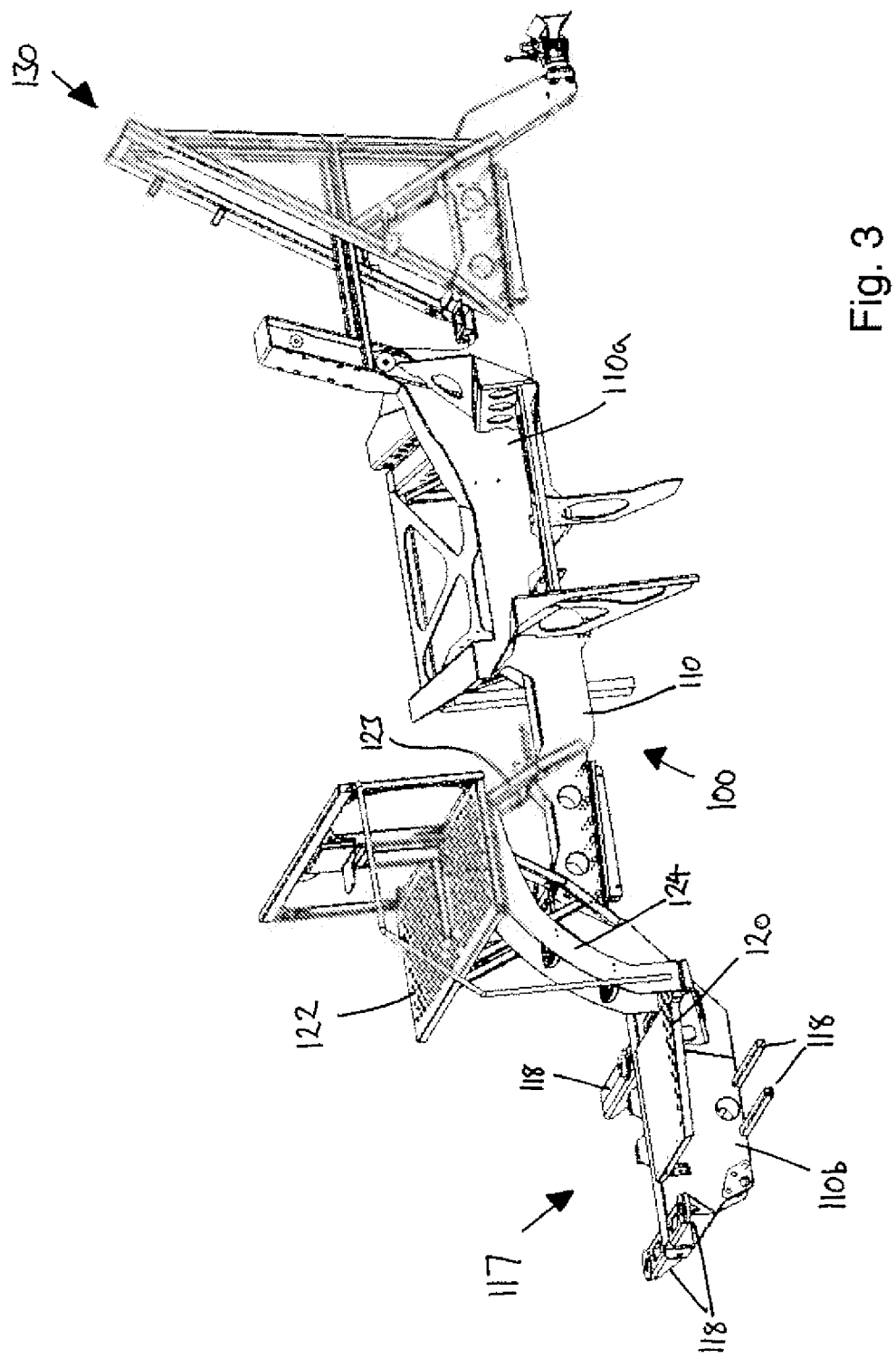
FIG. 3 is a perspective view of the chassis of the sprayer of FIG. 1.
Figure 4:
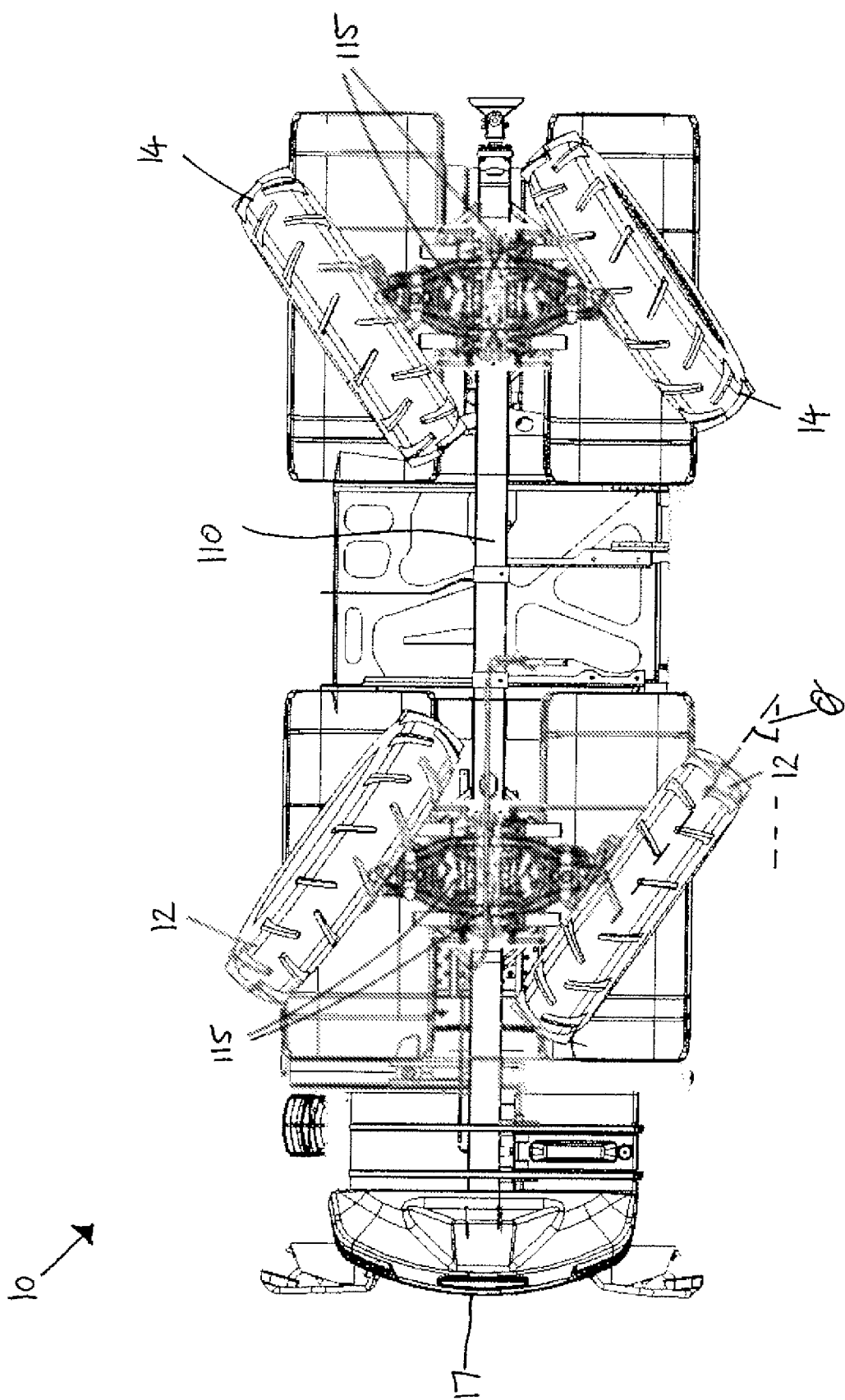
FIG. 4 is an underside view of the sprayer of FIG. 1 (with engine removed)
Figure 5:
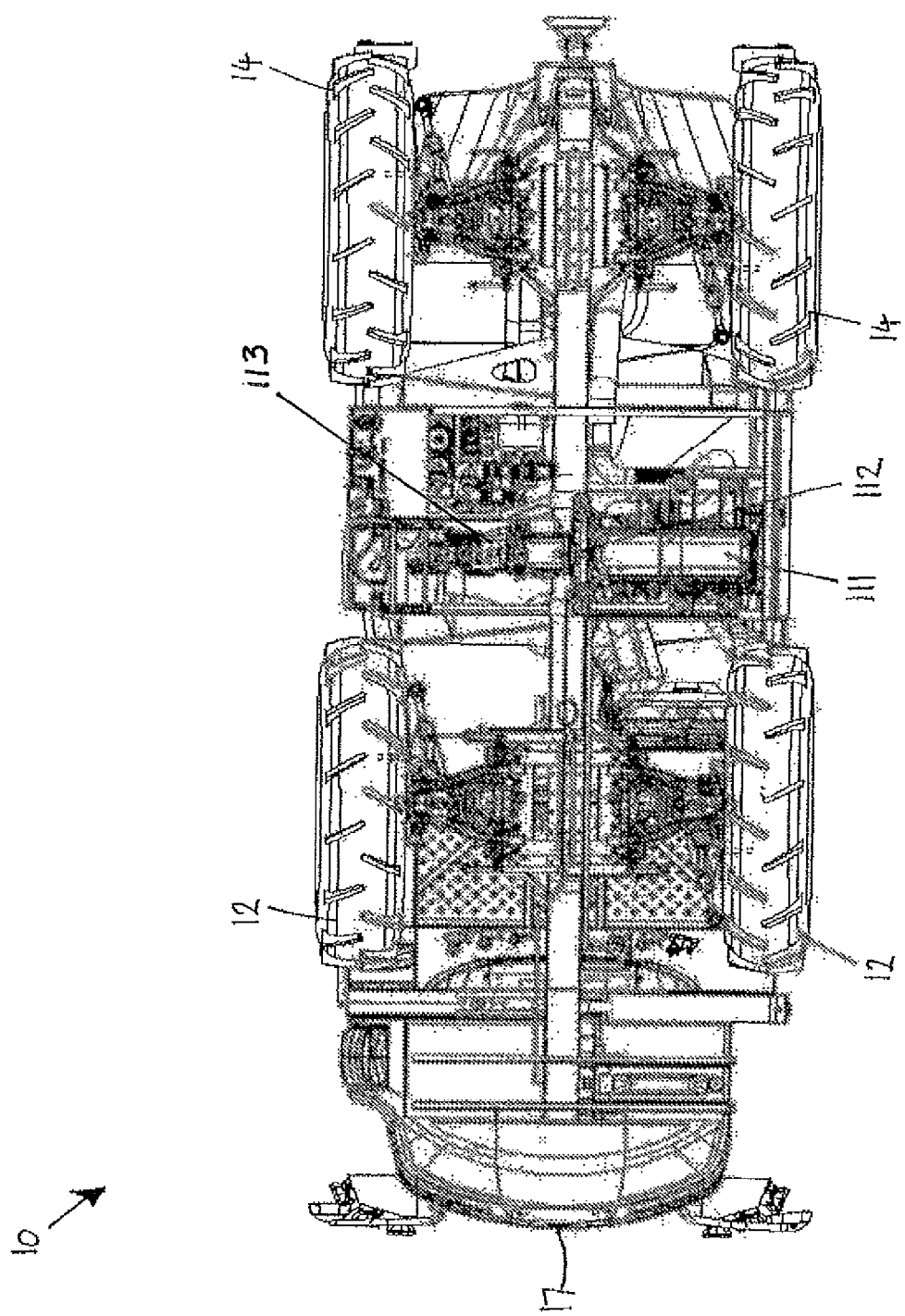
FIG. 5 is another underside view of the sprayer of FIG. 1.

The second section 110b of the longitudinal beam 110 provides part of a cab support structure referenced generally at 117 in FIG. 3. The longitudinal part 110b has connected thereto a plurality of transverse components 118 to adequately support the weight of cab 17. By providing the cab support structure 117 at a lower height to that of the first section 110a of the longitudinal beam, and thus the tank 15 supported thereon, the centre of mass and the overall height of the sprayer is lowered. Furthermore, the driver's visibility of the crop is improved.

A lower platform 120 is attached to the second section 110b so as to be positioned to the left-hand side of the cab 17. A raised platform 122 is attached to the first section 110a by a platform support structure 123 so as to be positioned behind the cab 17. A set of steps 124 is provided between the lower platform 120 and the raised platform 122 to allow a driver to reach the latter. From the raised platform 122, a driver is able to access the top of the tank 15.

Turning to the rear of the chassis 100, a boom support structure 130 is secured to the rear of the longitudinal beam 110. The boom assembly 16 is pivotally mounted to the boom support structure 130 to allow the boom assembly 16 to be raised and lowered. A boom lift actuator (not shown) is connected between the boom support structure 130 and the boom assembly 16 to lift and lower the boom assembly.

Figure 6:
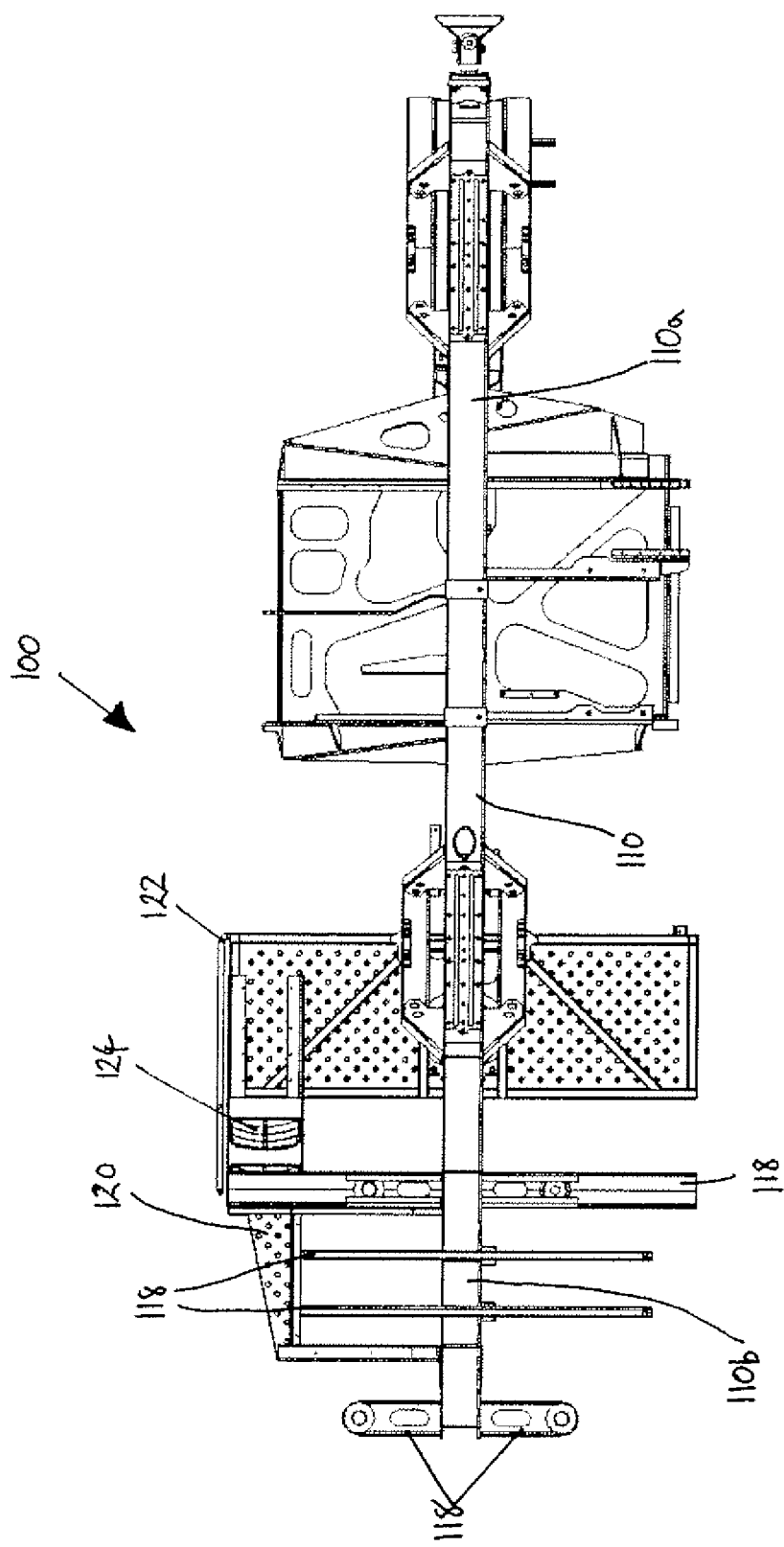
FIG. 6 is a plan view of the part of the sprayer shown in FIG. 3.
Figure 7:
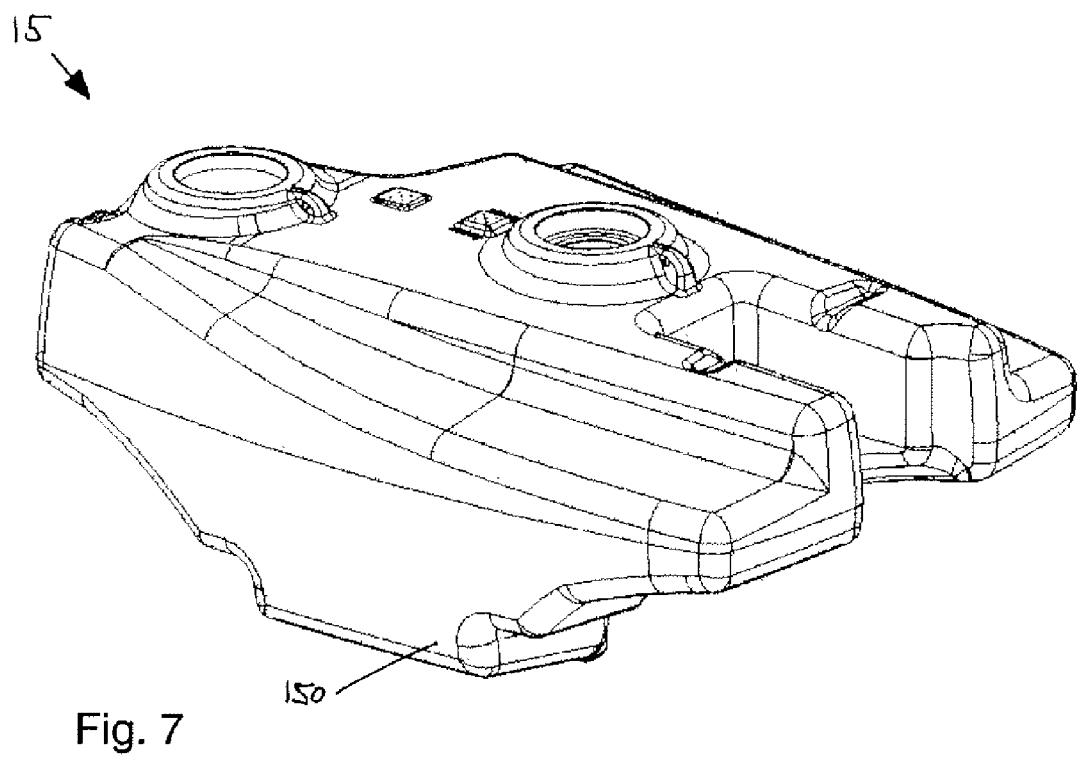
FIG. 7 is a perspective view of the tank of the sprayer of FIG. 1.
Figure 8:
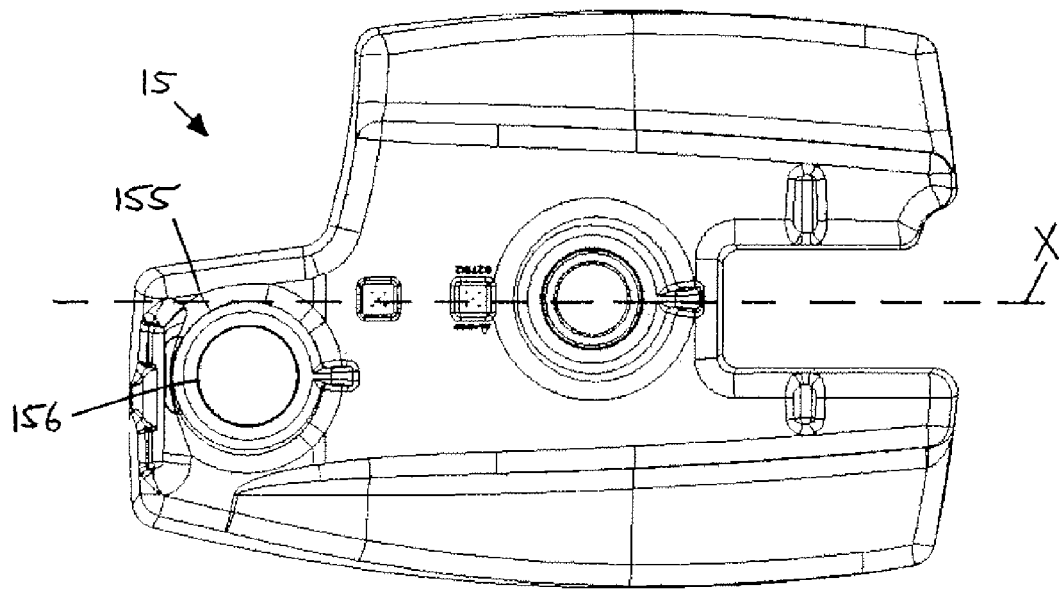
FIG. 8 is a plan view of the tank of FIG. 7.
Figure 9:
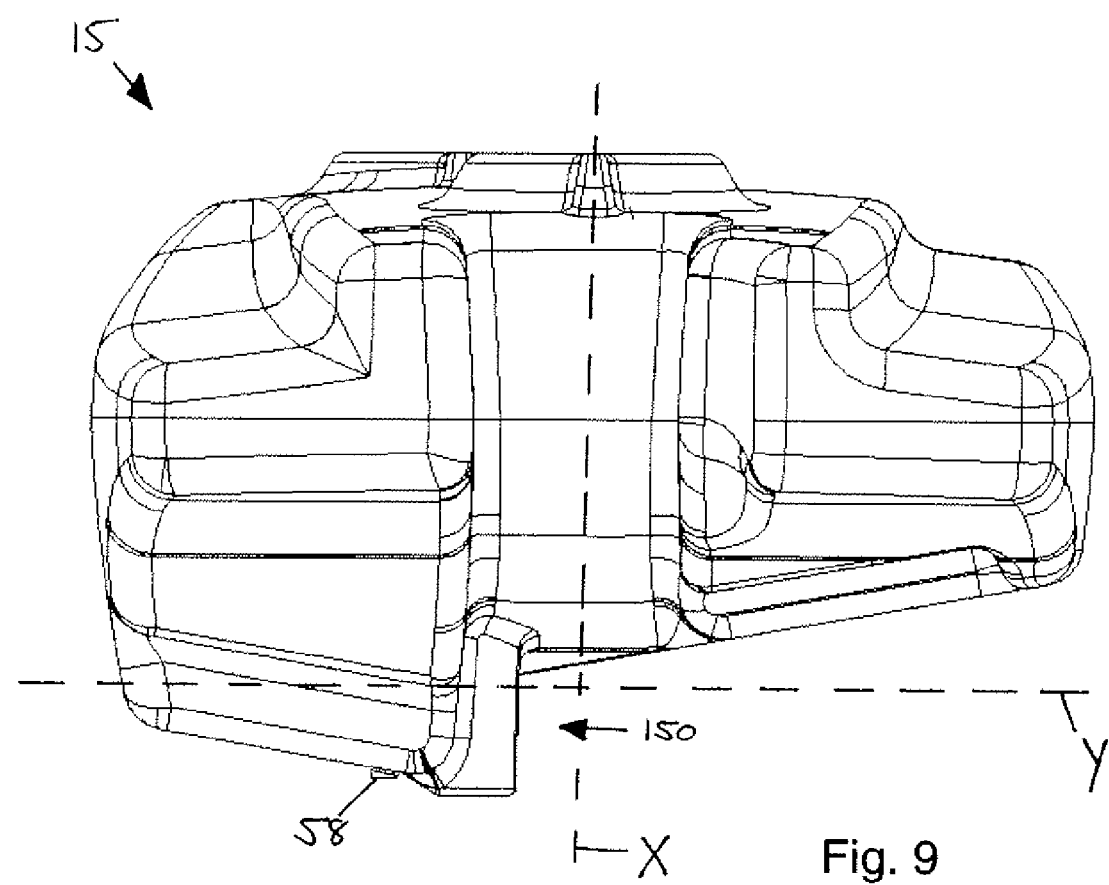
FIG. 9 is a rear view of the tank of FIG. 7.

With reference to FIGS. 7, 8 and 9, the storage tank 15 is formed of moulded plastic and has a volume of 4500 liters for example. As can be seen from FIG. 9, the tank 15 comprises a downwardly-extending portion 150 on the left-hand side which is not reflected about longitudinal and vertical plane X. In other words there is not an equivalent volume extension on the right-hand side. Therefore, in accordance with the invention, the tank is asymmetric about the longitudinal vertical plane X at least across the horizontal section Y (FIG. 6).

Furthermore, as can be seen from FIG. 8, the tank comprises a forwardly-extending portion 155 on the left-hand side which is also not reflected about plane X. This forward portion 55 comprises a capped filler hole 156 for filling the tank 15 with application material, typically via a hose (not shown).

The two volume extensions 154, 155 deliver a significantly greater tank volume on the left-hand side than on the right-hand side. The weight of the engine 111 is thus counterbalanced by the asymmetry thereby improving the overall stability of the sprayer 10.

The downwardly-extending portion 154 is disposed opposite the engine 111 thus minimising any torsion forces on the relatively narrow chassis 100. Moreover, being the lowest part of the tank 15, the portion 154 is the last part of the tank to empty during an application to a field. Therefore, even when the level of application material present in the tank 15 is low, the weight of the side-disposed engine 111 is counterbalanced.

The sprayer 10 further comprises a fuel tank also disposed on the right-hand side of the chassis 100. The downwardly-extending portion 154 serves also to counterbalance the weight of the fuel tank and the fuel contained therein across the longitudinal plane X.

The tank 15 also comprises an extraction pipe 58 located at the bottom of the downward extension 54 to extract the application material during operation.

In summary, there is provided a self-propelled agricultural application machine comprising a chassis which carries a storage tank for the material to be applied is provided. The chassis comprises a central longitudinal beam from which at least a pair of wheels are suspended. The narrow chassis allows steerable wheels to be positioned at tolerable track widths whilst permitting a large steering angle and thus small turning radii.

From reading the present disclosure, other modification will be apparent to persons skilled in the art. Such modifications may involve other features which are already known in the field of agricultural application machines and component parts therefore and which may be used instead of or in addition to features already described herein.

The invention claimed is:

1. A self-propelled agricultural application machine comprising:
   a chassis comprising a central longitudinal beam from which are suspended a pair of front wheels and a pair of rear wheels;
   a storage tank containing material to be applied mounted on the chassis, wherein the storage tank is positioned on the chassis so that it extends on both sides of the central longitudinal beam but is asymmetric about a longitudinal vertical plane along the centre of the chassis such that a volume of the storage tank disposed to one side of the plane is greater than a volume of the storage tank disposed to the other side, and wherein said storage tank has a downwardly-extending portion on the one side of the longitudinal vertical plane with the greater volume without a corresponding downwardly-extending portion on said other side of the plane, said downwardly-extending portion being a lowest part of the storage tank and a last part of the storage tank to empty during application of the material by the agricultural application machine; and
   an engine which is disposed transversely offset to one side of the longitudinal beam and longitudinally positioned between said front wheels and said rear wheels, wherein the engine comprises an output drive shaft which is transversely orientated and connected to hydraulic pumps which are positioned on an opposite side of the longitudinal beam between the front wheels and the rear wheels, wherein the downwardly-extending portion of the storage tank is disposed on the side of the longitudinal beam opposite the engine to counterbalance a weight of the engine.

2. The application machine according to claim 1, wherein at least one of the two pairs of wheels are steerable.

3. The application machine according to claim 2, wherein the steerable wheels have a maximum steering angle which is greater than 35 degrees.

4. The application machine according to claim 1, wherein the wheels are independently suspended.

5. The application machine according to claim 1, further comprising a cab which is supported forwardly of the longitudinal beam by a cab support structure which is itself supported by the longitudinal beam.

6. The application machine according to claim 1, further comprising a boom assembly which is suspended from the rear section of the longitudinal beam and, when in an operating mode, extends transversely with respect to the longitudinal beam.

7. The application machine according to claim 6, wherein the boom assembly is pivotally mounted to the longitudinal beam to allow the boom assembly to be raised and lowered.

8. The application machine according to claim 7, further comprising a boom lift actuator connected between the longitudinal beam and the boom assembly to lift and lower the boom assembly.

9. The application machine according to claim 1, further comprising a fuel tank which is disposed to one side and forwardly of the longitudinal beam.

10. The application machine according to claim 9, further comprising a cab which is supported forwardly of the longitudinal beam by a cab support structure which is itself supported by the longitudinal beam, wherein the fuel tank is disposed under the cab.

11. The application machine according to claim 1, wherein the wheels have a variable track width.

* * * * *